(12) United States Patent
Chen et al.

(10) Patent No.: US 12,353,912 B2
(45) Date of Patent: Jul. 8, 2025

(54) TASK PROCESSING METHOD, TASK PROCESSING DEVICE, AND COMPUTER PROGRAM PRODUCT

(71) Applicant: Dell Products L.P., Round Rock, TX (US)

(72) Inventors: Tianxiang Chen, Shanghai (CN); Yuhong Nie, Shanghai (CN); Sanping Li, Beijing (CN); Anzhou Hou, Shanghai (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 546 days.

(21) Appl. No.: 17/826,670

(22) Filed: May 27, 2022

(65) Prior Publication Data

US 2023/0342193 A1 Oct. 26, 2023

(30) Foreign Application Priority Data

Apr. 22, 2022 (CN) .......................... 202210432110.X (51) Int. Cl.
  *G06F 9/48* (2006.01)
  *G06N 3/045* (2023.01)
  *G06N 3/08* (2023.01)

(52) U.S. Cl.
  CPC ........... *G06F 9/4881* (2013.01); *G06N 3/045* (2023.01); *G06N 3/08* (2013.01)

(58) Field of Classification Search
  CPC .... G06F 9/4881; G06F 9/5044; G06F 9/5072; G06N 3/045; G06N 3/08; G06N 3/0464; G06N 3/049; G06N 3/096; G06N 3/063
  See application file for complete search history.

(56) References Cited

U.S. PATENT DOCUMENTS

2013/0323700 A1* 12/2013 Samosky ............... G09B 23/30
  434/262
2014/0365258 A1* 12/2014 Vestal ............ G06Q 10/063114
  901/1

(Continued)

OTHER PUBLICATIONS

Wikipedia, "Biological Neuron Model," https://en.wikipedia.org/wiki/Biological_neuron_model#Leaky_integrate-and-fire, Jan. 29, 2022, 24 pages.

(Continued)

*Primary Examiner* — Tuan C Dao
(74) *Attorney, Agent, or Firm* — Ryan, Mason & Lewis, LLP (57) ABSTRACT

Embodiments of the present disclosure relate to a task processing method, a task processing device, and a computer program product. The method includes: receiving a task to be processed by a first neural network at a first computing node; determining that the first neural network failed to process the task; and sending the task to a second computing node for processing by a second neural network at the second computing node, wherein compared with the first neural network, the second neural network has at least one of the following: higher processing consumption and higher processing performance. With the technical solution of the present disclosure, a task can be processed quickly and accurately using a neural network with low processing consumption.

20 Claims, 3 Drawing Sheets

(56) References Cited

U.S. PATENT DOCUMENTS

| | | | |
|---|---|---|---|
| 2016/0217388 A1* | 7/2016 | Okanohara | G06N 20/00 |
| 2016/0275395 A1* | 9/2016 | Amir | G06N 3/08 |
| 2017/0282371 A1* | 10/2017 | Erhart | G06Q 30/016 |
| 2017/0285628 A1* | 10/2017 | Erhart | B25J 13/006 |
| 2019/0057286 A1* | 2/2019 | Woulfe | H04N 21/23418 |
| 2019/0122119 A1* | 4/2019 | Husain | G06N 3/086 |
| 2020/0019883 A1* | 1/2020 | McCourt, Jr. | G06N 7/00 |
| 2020/0139975 A1* | 5/2020 | Ishikawa | B60W 40/04 |
| 2020/0156243 A1* | 5/2020 | Ghare | G06N 20/00 |
| 2021/0002094 A1* | 1/2021 | Matsukawa | G03G 15/6502 |
| 2021/0123771 A1* | 4/2021 | Vega | H04Q 9/00 |
| 2021/0134279 A1* | 5/2021 | Mallenahally | G10L 15/1822 |
| 2021/0350689 A1* | 11/2021 | Kelly | G08B 21/245 |
| 2022/0155739 A1* | 5/2022 | Baazi | G05B 23/0283 |
| 2022/0297301 A1* | 9/2022 | Kelch | B25J 9/1692 |
| 2023/0191608 A1* | 6/2023 | Horowitz | B25J 9/163 |
| | | | 700/245 |
| 2023/0244987 A1* | 8/2023 | Truong | G06N 20/00 |
| | | | 706/11 |

OTHER PUBLICATIONS

Wikipedia, "Spiking Neural Network," https://en.wikipedia.org/w/index.php?title=Spiking_neural_network&oldid=, Jan. 20, 2022, 9 pages.
S. Lu et al., "Exploring the Connection Between Binary and Spiking Neural Networks," arXiv:2002.10064v3, May 21, 2020, 10 pages.
C. Lee et al., "Enabling Spike-Based Backpropagation for Training Deep Neural Network Architectures," Frontiers in Neuroscience, vol. 14, No. 119, Feb. 28, 2020, 22 pages.
U.S. Appl. No. 17/668,537 filed in the name of Yuhong Nie et al. on Feb. 10, 2022, and entitled "Method, Electronic Device, and Computer Program Product for Processing Video.".

* cited by examiner

TASK PROCESSING METHOD, TASK PROCESSING DEVICE, AND COMPUTER PROGRAM PRODUCT

RELATED APPLICATION(S)

The present application claims priority to Chinese Patent Application No. 202210432110.X, filed Apr. 22, 2022, and entitled "Task Processing Method, Task Processing Device, and Computer Program Product," which is incorporated by reference herein in its entirety.

FIELD

Embodiments of the present disclosure generally relate to the field of artificial intelligence, and in particular to a task processing method, a task processing device, and a computer program product.

BACKGROUND

Spiking neural networks, also commonly referred to as SNNs, are an increasingly important area of research in recent years. Compared with existing deep neural networks, the structure of the spiking neural network is closer to that of biological models in nature. Because of its event-driven and power-efficient characteristics, the spiking neural network has apparent advantages in pattern recognition, target detection in the case of continuous sequence frames, and other aspects. In particular, the spiking neural network is characterized by low power consumption and low hardware device requirements, but it is deficient in terms of accuracy in processing tasks and the complexity of tasks that can be processed.

Currently, for vision-related tasks, convolutional neural networks, also commonly referred to as CNNs, are undoubtedly one of the best-performing neural networks. Convolutional neural networks have been widely used in different applications in various industries because of their diverse structures and high accuracy. However, although convolutional neural networks are excellent in terms of accuracy in processing tasks and the complexity of tasks that can be processed, they typically have high power consumption in processing tasks and high hardware device requirements.

Therefore, neither spiking neural networks nor convolutional neural networks can provide a user with an ideal experience when using neural networks.

SUMMARY

Embodiments of the present disclosure provide a task processing method, a task processing device, and a computer program product.

In a first aspect of the present disclosure, a task processing method is provided. The method includes: receiving a task to be processed by a first neural network at a first computing node; determining that the first neural network failed to process the task; and sending the task to a second computing node for processing by a second neural network at the second computing node, wherein compared with the first neural network, the second neural network has at least one of the following: higher processing consumption and higher processing performance.

In a second aspect of the present disclosure, a task processing method is provided. The method includes: receiving a task to be processed by a second neural network at a second computing node from a first computing node, wherein the first neural network at the first computing node failed to process the task, and compared with the first neural network, the second neural network has at least one of the following: higher processing consumption and higher processing performance; and obtaining a processing result by processing the task by the second neural network.

In a third aspect of the present disclosure, a task processing device is provided. The device includes: at least one processing unit; and at least one memory coupled to the at least one processing unit and storing instructions for execution by the at least one processing unit, wherein the instructions, when executed by the at least one processing unit, cause the device to perform actions including: receiving a task to be processed by a first neural network at a first computing node; determining that the first neural network failed to process the task; and sending the task to a second computing node for processing by a second neural network at the second computing node, wherein compared with the first neural network, the second neural network has at least one of the following: higher processing consumption and higher processing performance.

In a fourth aspect of the present disclosure, a task processing device is provided. The device includes: at least one processing unit; and at least one memory coupled to the at least one processing unit and storing instructions for execution by the at least one processing unit, wherein the instructions, when executed by the at least one processing unit, cause the device to perform actions including: receiving a task to be processed by a second neural network at a second computing node from a first computing node, wherein the first neural network at the first computing node failed to process the task, and compared with the first neural network, the second neural network has at least one of the following: higher processing consumption and higher processing performance; and obtaining a processing result by processing the task by the second neural network.

In a fifth aspect of the present disclosure, a computer program product is provided. The computer program product is tangibly stored on a non-transitory computer-readable medium and includes machine-executable instructions, wherein the machine-executable instructions, when executed, cause a machine to perform any step of the method described according to the first aspect of the present disclosure.

In a sixth aspect of the present disclosure, a computer program product is provided. The computer program product is tangibly stored on a non-transitory computer-readable medium and includes machine-executable instructions, wherein the machine-executable instructions, when executed, cause a machine to perform any step of the method described according to the first aspect of the present disclosure.

This Summary is provided to introduce the selection of concepts in a simplified form, which will be further described in the Detailed Description below. The Summary is neither intended to identify key features or essential features of the present disclosure, nor intended to limit the scope of the present disclosure.

BRIEF DESCRIPTION OF THE DRAWINGS

By more detailed description of example embodiments of the present disclosure, provided herein with reference to the accompanying drawings, the above and other objectives, features, and advantages of the present disclosure will become more apparent, where identical reference numerals generally represent identical components in the example embodiments of the present disclosure.

In the figures, identical or corresponding numerals represent identical or corresponding parts.

DETAILED DESCRIPTION

Example embodiments of the present disclosure will be described in more detail below with reference to the accompanying drawings. Although example embodiments of the present disclosure are shown in the accompanying drawings, it should be understood that the present disclosure may be implemented in various forms and should not be limited by the embodiments set forth herein. Rather, these embodiments are provided to make the present disclosure more thorough and complete and to fully convey the scope of the present disclosure to those skilled in the art.

The term "include" and variants thereof used herein indicate open-ended inclusion, that is, "including but not limited to." Unless specifically stated, the term "or" means "and/or." The term "based on" means "based at least in part on." The terms "an example embodiment" and "an embodiment" mean "at least one embodiment." The term "another embodiment" indicates "at least one additional embodiment." The terms "first," "second," and the like may refer to different or identical objects. Other explicit and implicit definitions may also be included below.

As described above in the background part, spiking neural networks and convolutional neural networks have their own advantages and limitations, respectively. Therefore, neither spiking neural networks nor convolutional neural networks can provide a user with an ideal experience when using neural networks.

Specifically, spiking neural networks have been very popular recently. In contrast to existing deep neural networks, the spiking neural network uses a biological reality model and attempts to simulate how the brain works to perform computations. The spiking neural network operates using spikes, wherein the spikes are discrete events that occur at points in time, rather than continuous values as in deep neural networks. The occurrence of spikes is determined by a differential equation representing various biological processes, and the membrane potential of a neuron is the most frequently referred to and used. In principle, only when the potential of the neuron reaches a certain threshold, can a signal propagate to its next layer; otherwise, the subsequent layers will remain unchanged, which makes event-driven computation possible. Due to this property, spiking neural networks are usually low on power consumption for, for example, video streaming data processing, and are ideal for time sequence data processing.

The convolutional neural network is an artificial neural network for image recognition and processing. From its development history, convolutional neural networks now have different components, such as convolutional layers, pooling layers, fully connected layers, and so on. Each component performs a specific function for the whole process of processing a task by the convolutional neural network. By combining different components together and by performing proper training to obtain their final weights, the convolutional neural network can work efficiently and is the best candidate for most computer vision tasks today.

Hereinafter, the limitations of a convolutional neural network and a spiking neural network when working alone for target detection tasks in edge scenarios will be specifically illustrated, and how to convert a deep neural network model to a spiking neural network model, which is currently the common way to generate a spiking neural network model, will be presented.

The convolutional neural network is currently the standard solution for target detection tasks. Over the past decades, the convolutional neural network has developed many hierarchical components and network structures, and has been demonstrated to have the ability to handle a variety of vision-related tasks with good results.

In a scenario of edge computing nodes, one of the main problems with the convolutional neural network is related to power consumption. Due to the property of the deep neural network, computations are performed in the case of continuous values, so each neuron will take its input from neurons in the previous layer and perform the computation, and then propagate its output to neurons in the next layer. This means that during the inference stage, each unit in the network structure will be executed, and thus consumes power. In addition, components such as convolutional layers require a large amount of multiplication operations, which may impose high computational costs.

However, in the case of edge computing node usage, devices located at edge computing nodes are usually relatively low in terms of computational power and are expected to operate in a low power mode. Therefore, to meet these requirements, convolutional neural networks must be designed to be small in scale at the expense of their performance.

Some lightweight or miniature convolutional neural network models already exist, and their power consumption is relatively small, but spiking neural networks are capable of having a much smaller power consumption. In addition, spiking neural networks have some additional advantages, such as being better at handling sparse events, which is suitable for some special usage cases.

In terms of time, spiking neural networks are fundamentally different from artificial neural networks or convolutional neural networks. In an artificial neural network, inference is performed based on a single feedforward channel through the network. In contrast, a spiking neural network consists of a network of neurons propagating through a sequence of binary spikes over a specific number of time steps T, where the time step T is often referred to as the inference latency of the spiking neural network. Each synaptic neuron of the spiking neural network layer has a spiking power that is characterized by a biological model such as the Integrate-Fire (IF) or Leaky-Integrate-Fire (LIF) model. The LIF neuron power may be modeled as the following Equation (1):

$$u_i^{t+1} = \left(1 - \frac{dt}{\tau}\right)u_i^t + \frac{dt}{\tau}I \qquad (1)$$

This denotes the membrane potential of the ith neuron at time step t+1, $\tau$ is a time constant, and I is an input from a presynaptic neuron. Furthermore, in order to evaluate the model in a discrete-time manner, the iterative model of Equation (1) for the linear layer may be modified as $$u_i^{t+1} = \lambda u_i^t + \sum_j w_{ij} O_j^t - v_{th} O_i^t \qquad (2)$$

$$O_i^t = \begin{cases} 1, & u_i^t > v_{th} \\ 0, & \text{otherwise} \end{cases}$$

where the decay factor $$\left(1 - \frac{dt}{\tau}\right)$$

of Equation (1) is replaced by the term $\lambda$, where $\lambda$ is set to 1 for IF and less than 1 for LIF. Here, $O_i^t$ and $O_j^t$ denote output spikes of the current neuron i and its presynaptic neuron j, respectively, $w_{ij}$ denotes the weight therebetween, and $v_{th}$ is the excitation threshold of the current layer. Inference is performed by simply comparing the total number of spikes generated by each output neuron over T time steps.

For a spiking neural network, a signal propagates only when it exceeds the threshold and with the help of specially designed neuromorphological hardware, so the spiking neural network operates with very low power consumption.

The training of spiking neural networks is challenging because no exact gradient of the binary spiking sequence is defined, which forces the use of approximate gradients, the training complexity is proportional to the number of time steps T, and the time step T may be very large. As a result, compared with convolutional neural networks, edge devices enabled with spiking neural networks typically have relatively low accuracy while having low power consumption.

The training of spiking neural network models is still challenging because common training methods for conventional neural networks cannot be directly applied to spiking neural networks due to their unique operation mode. Currently, a common approach to generating a trained spiking neural network model is to transform a trained convolutional neural network model. This approach attempts to use the parameters of a pre-trained deep neural network (DNN) and map them to an equivalent and accurate spiking neural network. Over the last decade, research and updates have been conducted to improve the transformation method, which has largely reduced the transformation loss. At the same time, there are still many limitations for the structure of the convolutional neural network on which the transformation is performed, for example, only some layers and activation functions in the latest convolutional neural network domain are supported. In other words, if a pre-trained convolutional neural network has some layers or activation functions that are not supported by the transformation, it cannot be transformed into an equivalent spiking neural network model, in which case the convolutional neural network model may be redesigned to avoid encountering these limitations, and then the convolutional neural network model may be retrained and the transformation performed.

In order to at least partially solve one or more of the above problems and other potential problems, embodiments of the present disclosure provide an approach in which a spiking neural network and a convolutional neural network are used in combination. To this end, a design including a new workflow is provided, where the workflow enables the coexistence of a spiking neural network and a convolutional neural network in an edge computing scenario for use in video-related tasks such as target detection, object detection, and anomaly detection. This design exploits both the low power consumption properties of the spiking neural network and the high accuracy properties of the convolutional neural network to quickly obtain accurate prediction results in terms of the combination of edge computing nodes and cloud computing nodes. Meanwhile, it further provides the possibility for the spiking neural network model to improve its prediction performance over time due to the introduction of a feedback loop from the cloud computing node where the convolutional neural network is located to the edge computing node where the spiking neural network is located.

Figure 1:
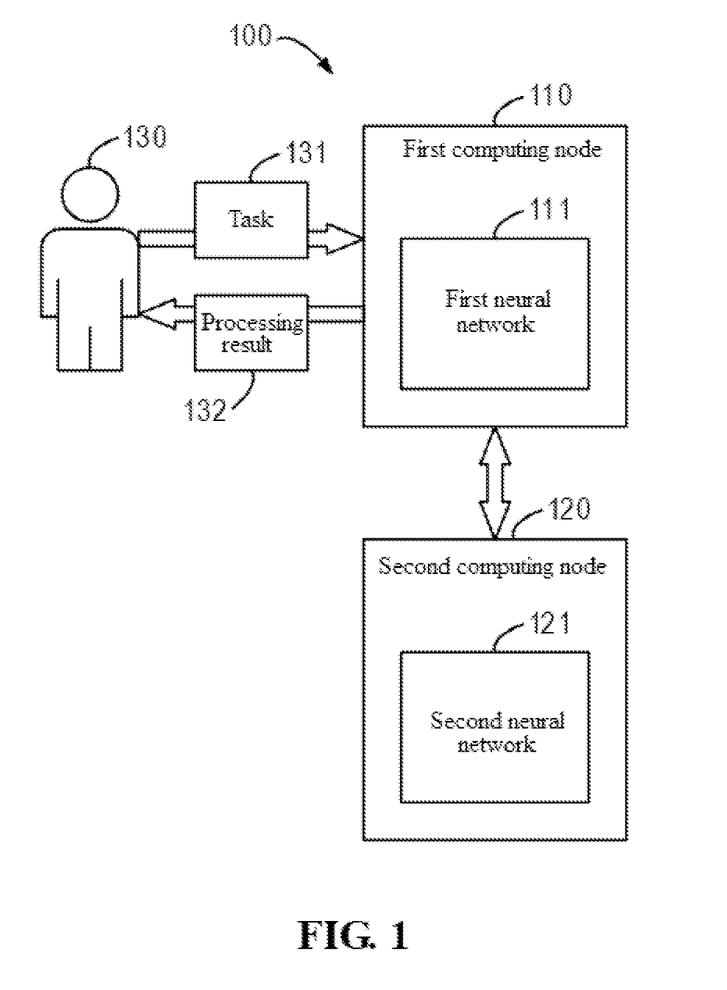
FIG. 1 illustrates a schematic diagram of a task processing environment in which task processing methods in some embodiments of the present disclosure can be implemented.

FIG. 1 illustrates a schematic diagram of task processing environment 100 in which a task processing method in some embodiments of the present disclosure can be implemented. Task processing environment 100 includes first computing node 110, second computing node 120, and user 130, where first computing node 110 includes first neural network 111, and second computing node 120 includes second neural network 121. In task processing environment 100, user 130 may interact with first computing node 110, such as sending task 131 expected to be processed by first neural network 111 to first computing node 110 or receiving processing result 132 obtained by processing task 131 from first computing node 110. Also, in task processing environment 100, first computing node 110 may also interact with second computing node 120, such as sending task 131 to second computing node 120 for processing by second neural network 121 when first neural network 111 is unable to process task 131, receiving processing result 132 obtained by processing task 131 from second computing node 120, or receiving an update to first neural network 111 that is generated by second computing node 120 based on task 131 and processing result 132 from second computing node 120.

According to embodiments of the present disclosure, first computing node 110 may be, for example, an edge computing node, second computing node 120 may be, for example, a cloud computing node, and first computing node 110 and second computing node 120 may therefore be connected, for example, via a network.

It should be noted that first computing node 110 and second computing node 120 are not limited to being an edge computing node and a cloud computing node, but may be any node having similar properties. According to some embodiments of the present disclosure, first computing node 110 and second computing node 120 may both be edge computing nodes, but compared with first computing node 110, second computing node 120 has a higher level of hardware configuration, higher security performance, or higher power consumption that it can support. According to some other embodiments of the present disclosure, first computing node 110 and second computing node 120 may also both be cloud computing nodes, but compared with first computing node 110, second computing node 120 has a higher level of hardware configuration, higher security performance, or higher power consumption that it can support.

According to embodiments of the present disclosure, first neural network 111 may be, for example, a spiking neural network, and second neural network 121 may be, for example, a convolutional neural network.

It should be noted that first neural network 111 and second neural network 121 are not limited to being a spiking neural network and a convolutional neural network. For example, first neural network 111 and second neural network 121 may be any form of neural network, but compared with second neural network 121, first neural network 111 has a higher processing consumption or higher processing performance.

It should be noted that task processing environment 100 is extendable, where more first computing nodes 110, more second computing nodes 120, and more users 130 may be included, such that the need for more users 130 to simultaneously utilize more first computing nodes 110 and more second computing nodes 120 as well as more first neural networks 111 and more second neural networks 121 included therein to process more tasks 131 and obtain more processing results 132 can be met. For simplicity of illustration, only one first computing node 110, one second computing node 120, and one user 130 are shown in FIG. 1.

In task processing environment 100, when second computing node 120 sends to first computing node 110 an update to first neural network 111 that is generated by second computing node 120 based on task 131 and processing result 132, according to some embodiments of the present disclosure, the update may be an incremental update to first neural network 111 such that first neural network 111 may be extended by that update so that task 131 that could not be processed prior to the update can be processed. According to some other embodiments of the present disclosure, the update may be a replacement update to first neural network 111, that is, it may be an updated first neural network 111 such that the updated first neural network 111 may be utilized to directly replace first neural network 111 in first computing node 110, and thus may process task 131 that could not be processed prior to the update.

According to some embodiments of the present disclosure, one or more additional third computing nodes may also be included in task processing environment 100, which may or may not include first neural network 111. At this point, second computing node 120 may send the aforementioned update to at least one of these third computing nodes periodically or when second computing node 120 generates an update to first neural network 111 based on task 131 and processing result 132, such that the third computing node may have an updated first neural network 111 after receiving the aforementioned update.

Task processing environment 100 shown in FIG. 1 in which task processing methods of some embodiments of the present disclosure can be implemented is described above, and task processing method 200 and task processing method 300 that may be performed based on task processing environment 100 will further be described below.

Figure 2:
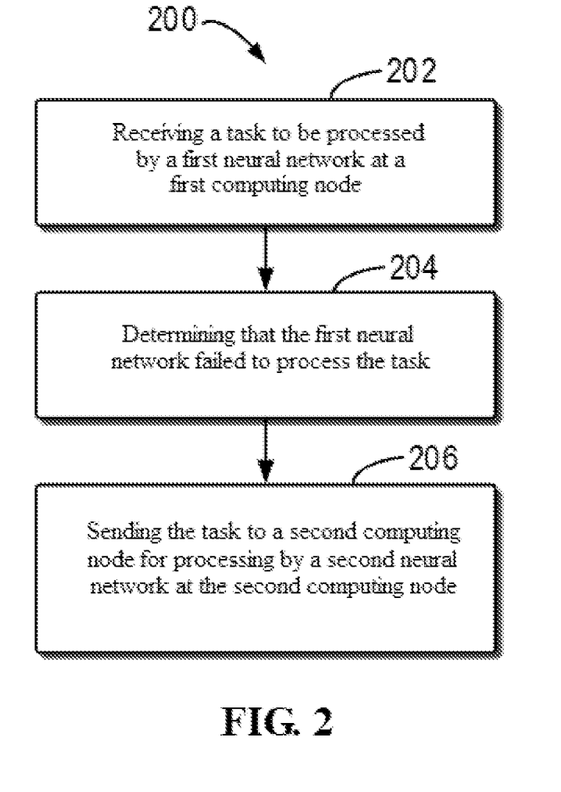
FIG. 2 illustrates a flow chart of a task processing method according to an embodiment of the present disclosure.

FIG. 2 illustrates a flow chart of task processing method 200 according to an embodiment of the present disclosure. Task processing method 200 may be implemented in task processing environment 100. Specifically, task processing method 200 may be implemented by first computing node 110 shown in FIG. 1 or by other appropriate devices. It should be understood that task processing method 200 may further include additional steps not shown and/or may omit the shown steps, and the scope of the embodiments of the present disclosure is not limited in this respect.

At block 202, first computing node 110 receives task 131 to be processed by first neural network 111 at first computing node 110. According to embodiments of the present disclosure, first computing node 110 may receive task 131 from user 130 or any other entity, and task 131 may include, for example, video-related tasks such as target detection, object detection, and anomaly detection.

At block 204, first computing node 110 determines that first neural network 111 failed to process task 131. According to embodiments of the present disclosure, first computing node 110 may first acquire processing data generated by first neural network 111 in processing task 131, and may then determine, based on the generated processing data, that first neural network 111 failed to process task 131.

The following description will take as an example that first computing node 110 is an edge computing node, first neural network 111 is a spiking neural network, and task 131 involves detecting an object from upcoming frames. First, this spiking neural network may be generated through performing designing, training, and transformation using a convolutional neural network. When receiving task 131 from user 130, this spiking neural network may process task 131 to attempt to detect the object from the arriving frame. If the spiking neural network successfully detects the object from the arriving frame, it may return to user 130 processing result 132 indicating successful detection of the object from the arriving frame, or send directly to user 130 an indication of the detected object as processing result 132. If this spiking neural network fails to detect the object from the arriving frame, at this point, due to the nature of the spiking neural network, it may generate some spiking sequences even if it fails to detect the object from the arriving frame. Specifically, spiking sequences generated by changing objects or emerging new objects are still fed to the spiking neural network, and the spiking neural network then continues to generate spiking sequences as output, but with a pattern that is not recognized in time and frequency. This detection may be accomplished by stacking newly added dense layers to the output layer, or by using only a set of matching rules to detect the temporal patterns of the output spikes. At this point, first computing node 110 may use the generated spiking sequence to determine the presence of new or complex objects that the spiking neural network cannot detect.

At block 206, first computing node 110 sends task 131 to second computing node 120 for processing by second neural network 121 at second computing node 120. According to embodiments of the present disclosure, compared with first neural network 111, second neural network 121 has at least one of the following: higher processing consumption and higher processing performance. The following description will take as an example that first neural network 111 is a spiking neural network, and second neural network 121 is a convolutional neural network, where compared with the spiking neural network, the convolutional neural network has higher processing consumption and higher processing performance.

According to embodiments of the present disclosure, in the case where first neural network 111 is a spiking neural network and second neural network 121 is a convolutional neural network, accordingly, first computing node 110 may be an edge computing node and second computing node 120 may be a cloud computing node. The purpose of deploying the spiking neural network on the edge computing node is to use less power and provide a greater processing speed at the edge computing node.

With the above steps, when first neural network 111 at first computing node 110 is unable to process task 131, first computing node 110 may send task 131 to second computing node 120 for processing, thus making it possible to avoid the situation where task 131 cannot be processed correctly because first neural network 111 is unable to process task 131.

After first computing node 110 sends task 131 to second computing node 120, according to some embodiments of the present disclosure, first computing node 110 may receive processing result 132 obtained by processing task 131 by second neural network 121 from second computing node 120. Thereafter, first computing node 110 may send processing result 132 to user 130, and may additionally or alternatively send processing result 132 to one or more other entities.

According to some other embodiments of the present disclosure, after first computing node 110 sends task 131 to second computing node 120, first computing node 110 may receive an update to first neural network 111 that is generated based on the task and the processing result from second computing node 120. According to embodiments of the present disclosure, the aforementioned update may be generated by second computing node 120 and may be an incremental update or a replacement update to first neural network 111.

It should be understood that task processing method 200 has been described above with first computing node 110 as the executing entity. Accordingly, according to some other embodiments of the present disclosure, operations need to be performed correspondingly by second computing node 120 in task processing environment 100, and these embodiments will be described specifically below in connection with FIG. 3.

Figure 3:
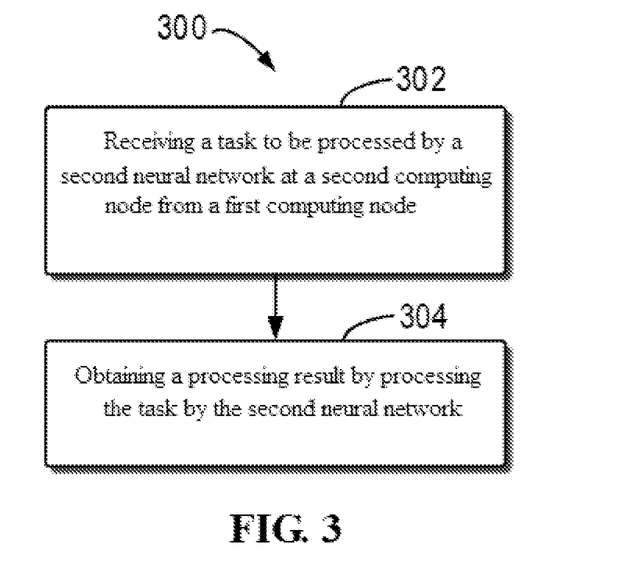
FIG. 3 illustrates a flow chart of a task processing method according to an embodiment of the present disclosure.

FIG. 3 illustrates a flow chart of task processing method 300 according to an embodiment of the present disclosure. Task processing method 300 may be implemented in task processing environment 100. Specifically, task processing method 300 may be implemented by second computing node 120 shown in FIG. 1 or by other appropriate devices. It should be understood that task processing method 300 may further include additional steps not shown and/or may omit the shown steps, and the scope of the embodiments of the present disclosure is not limited in this respect.

At block 302, second computing node 120 receives task 131 to be processed by second neural network 121 at second computing node 120 from first computing node 110. According to embodiments of the present disclosure, first neural network 111 at first computing node 110 fails to process task 131, and compared with first neural network 111, second neural network 121 has at least one of the following: higher processing consumption and higher processing performance. The content shown in block 302 corresponds to the content in task processing method 200 shown with reference to FIG. 2 and will not be repeated here.

At block 304, second computing node 120 obtains processing result 132 by processing task 131 by second neural network 121. The content shown in block 304 corresponds to the content in task processing method 200 shown with reference to FIG. 2 and will not be repeated here.

With the above steps, when first neural network 111 at first computing node 110 is unable to process task 131, first computing node 110 may send task 131 to second computing node 120 for processing, thus making it possible to avoid the situation where task 131 cannot be processed correctly because first neural network 111 is unable to process task 131.

According to some embodiments of the present disclosure, after second computing node 120 obtains processing result 132 by processing task 131 by second neural network 121, second computing node 120 may send processing result 132 to first computing node 110, to user 130, or to any other entity if necessary.

According to some other embodiments of the present disclosure, after second computing node 120 obtains processing result 132 by processing task 131 by second neural network 121, second computing node 120 may generate an update to first neural network 111 based on task 131 and processing result 132, and may send the update to first computing node 110. In addition to this, second computing node 120 may also send the aforementioned update to at least one computing node deployed with first neural network 111 other than first computing node 110 for updating first neural network 111 at those computing nodes. Further, second computing node 120 may also send the aforementioned update to at least one computing node not deployed with first neural network 111 other than first computing node 110 for causing first neural network 111 to be deployed at those computing nodes.

Contents related to task processing environment 100 in which the task processing methods in some embodiments of the present disclosure can be implemented, task processing method 200 according to an embodiment of the present disclosure, and task processing method 300 according to an embodiment of the present disclosure have been described above with reference to FIGS. 1 to 3. It should be understood that the above description is to better demonstrate the content recorded in the present disclosure, and is not intended to limit the present disclosure in any way.

It should be understood that the numbers of various elements and the magnitudes of physical quantities used in the above drawings of the present disclosure are only examples, and are not intended to limit the protection scope of the embodiments of the present disclosure. The above numbers and magnitudes may be arbitrarily set as needed without affecting the normal implementation of the embodiments of the present disclosure.

Through the above description with reference to FIGS. 1 to 3, the technical solutions according to embodiments of the present disclosure have many advantages over conventional solutions. For example, the technical solution according to embodiments of the present disclosure exploits both the low power consumption properties of spiking neural networks and the high accuracy properties of convolutional neural networks to quickly obtain accurate prediction results in terms of the combination of edge computing nodes and cloud computing nodes. Meanwhile, it further provides the possibility for the spiking neural network model to improve its prediction performance over time due to the introduction of a feedback loop from the cloud computing node where the convolutional neural network is located to the edge computing node where the spiking neural network is located.

Specifically, the technical solution according to embodiments of the present disclosure provides an architecture in which a spiking neural network and a convolutional neural network coexist for collaborative computation, which has the advantages of both methods. In the technical solution according to embodiments of the present disclosure, the spiking neural network is deployed at the edge computing node. The spiking neural network is converted from a pre-trained convolutional neural network model so as to perform computer vision tasks, such as classification and detection. This method consumes less power and provides faster predictions than solutions that use convolutional neural network models directly at the edge computing nodes. In addition, the technical solution according to embodiments of the present disclosure builds a bridge for using powerful convolutional neural networks at cloud computing nodes so that, in the case where the spiking neural network detects unknown anomalies, some properties of the spiking sequence can still be generated to assist the spiking neural network in classification or detection tasks that cannot be processed at the edge computing nodes. In addition, the technical solution according to embodiments of the present disclosure further provides a method for keeping improving the spiking neural network during the inference stage of the edge computing node scenario.

By way of example, after a spiking neural network is deployed at an edge computing node and a convolutional neural network is deployed at a cloud computing node, when the edge computing node receives a task to be processed, the task may be processed using the spiking neural network at the edge computing node with a small network latency, and if the task can be processed properly, the task processing can be completed with minimal processing consumption; and if the task cannot be processed properly, the edge computing node sends the task to the cloud computing node for execution by the convolutional neural network so that the successful processing of the task can be guaranteed with high accuracy.

Figure 4:
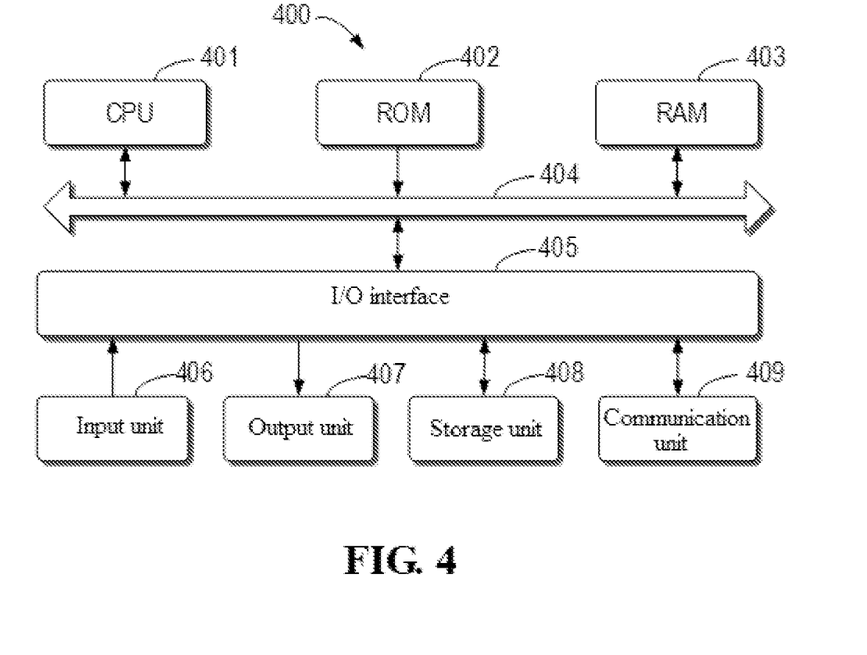
FIG. 4 illustrates a schematic block diagram of an example device that can be used to implement embodiments of the present disclosure.

FIG. 4 illustrates a schematic block diagram of example device 400 that can be used to implement embodiments of the present disclosure. As shown in the figure, device 400 includes central processing unit (CPU) 401 that may execute various appropriate actions and processing according to computer program instructions stored in read-only memory (ROM) 402 or computer program instructions loaded from storage unit 408 to random access memory (RAM) 403. RAM 403 may further store various programs and data required by operations of device 400. CPU 401, ROM 402, and RAM 403 are connected to each other through bus 404. Input/output (I/O) interface 405 is also connected to bus 404.

A plurality of components in device 400 are connected to I/O interface 405, including: input unit 406, such as a keyboard and a mouse; output unit 407, such as various types of displays and speakers; storage unit 408, such as a magnetic disk and an optical disc; and communication unit 409, such as a network card, a modem, or a wireless communication transceiver. Communication unit 409 allows device 400 to exchange information/data with other devices through a computer network such as the Internet and/or various telecommunication networks.

The various processes and processing described above, for example, method 200 and method 300, may be performed by CPU 401. For example, in some embodiments, method 200 and method 300 may be implemented as a computer software program that is tangibly included in a machine-readable medium, such as storage unit 408. In some embodiments, part of or all the computer programs may be loaded and/or installed onto device 400 via ROM 402 and/or communication unit 409. One or more actions of methods 200 and 300 described above may be executed when the computer program is loaded into RAM 403 and executed by CPU 401.

Embodiments of the present disclosure include a method, a device, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described herein with reference to flow charts and/or block diagrams of the method, the device (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented by using a combination of special hardware and computer instructions.

Example embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments or technical improvements to technologies on the market, so as to enable persons of ordinary skill in the art to understand the embodiments disclosed herein.

What is claimed is:

1. A task processing method, comprising:
    deploying a first neural network at a first computing node of an edge portion of a processor-based machine learning system implemented in accordance with an edge-cloud architecture;
    deploying a second neural network at a second computing node of a cloud portion of the processor-based machine learning system implemented in accordance with the edge-cloud architecture;
    instantiating a feedback loop between the edge portion of the processor-based machine learning system and the cloud portion of the processor-based machine learning system, utilizing at least one network coupled between the edge and cloud portions;
    receiving a task to be processed by the first neural network at the first computing node;
    determining that the first neural network failed to process the task; and
    sending the task to the second computing node via the feedback loop for processing by the second neural network at the second computing node, wherein the first neural network is of a first type having a first accuracy level, and the second neural network is of a second type different than the first type, the second neural network having a second accuracy level higher than the first accuracy level, and further wherein the first neural network is at least in part converted from the second neural network.

2. The method according to claim 1, wherein determining that the first neural network failed to process the task comprises:
    acquiring processing data generated by the first neural network in processing the task; and
    determining, based on the processing data, that the first neural network failed to process the task.

3. The method according to claim 1, further comprising receiving from the second computing node at least one of the following:
    a processing result obtained by processing the task by the second neural network; and
    an update to the first neural network that is generated based on the task and the processing result.

4. The method according to claim 1, wherein the first computing node is an edge computing node, and the second computing node is a cloud computing node.

5. The method according to claim 1, wherein the first neural network is a spiking neural network, and the second neural network is a convolutional neural network.

6. The method according to claim 1, further comprising:
    receiving the task to be processed by the second neural network at the second computing node from the first computing node; and
    obtaining a processing result by processing the task by the second neural network.

7. The method according to claim 6, further comprising: sending the processing result to the first computing node.

8. The method according to claim 6, further comprising: generating an update to the first neural network based on the task and the processing result; and
    sending the update to the first computing node.

9. The method according to claim 8, further comprising: sending the update to at least one computing node other than the first computing node for updating the first neural network at the at least one computing node.

10. A task processing device, comprising:
    at least one processing unit; and
    at least one memory coupled to the at least one processing unit and storing instructions for execution by the at least one processing unit, wherein the instructions, when executed by the at least one processing unit, cause the device to perform actions comprising:

deploying a first neural network at a first computing node of an edge portion of a processor-based machine learning system implemented in accordance with an edge-cloud architecture;

deploying a second neural network at a second computing node of a cloud portion of the processor-based machine learning system implemented in accordance with the edge-cloud architecture;

instantiating a feedback loop between the edge portion of the processor-based machine learning system and the cloud portion of the processor-based machine learning system, utilizing at least one network coupled between the edge and cloud portions;

receiving a task to be processed by the first neural network at the first computing node;

determining that the first neural network failed to process the task; and sending the task to the second computing node via the feedback loop for processing by the second neural network at the second computing node, wherein the first neural network is of a first type having a first accuracy level, and the second neural network is of a second type different than the first type, the second neural network having a second accuracy level higher than the first accuracy level, and further wherein the first neural network is at least in part converted from the second neural network.

11. The device according to claim 10, wherein determining that the first neural network failed to process the task comprises:

acquiring processing data generated by the first neural network in processing the task; and determining, based on the processing data, that the first neural network failed to process the task.

12. The device according to claim 10, wherein the actions further comprise receiving from the second computing node at least one of the following:

a processing result obtained by processing the task by the second neural network; and an update to the first neural network that is generated based on the task and the processing result.

13. The device according to claim 10, wherein the first computing node is an edge computing node, and the second computing node is a cloud computing node.

14. The device according to claim 10, wherein the first neural network is a spiking neural network, and the second neural network is a convolutional neural network.

15. The device according to claim 10, wherein the actions further comprise:

receiving the task to be processed by the second neural network at the second computing node from the first computing node; and obtaining a processing result by processing the task by the second neural network.

16. The device according to claim 15, wherein the actions further comprise:

sending the processing result to the first computing node.

17. The device according to claim 15, wherein the actions further comprise:

generating an update to the first neural network based on the task and the processing result; and sending the update to the first computing node.

18. The device according to claim 17, wherein the actions further comprise:

sending the update to at least one computing node other than the first computing node for updating the first neural network at the at least one computing node.

19. A computer program product tangibly stored on a non-transitory computer-readable medium and comprising machine-executable instructions, wherein the machine-executable instructions, when executed by a machine, cause the machine to perform steps of a task processing method, the method comprising:

deploying a first neural network at a first computing node of an edge portion of a processor-based machine learning system implemented in accordance with an edge-cloud architecture;

deploying a second neural network at a second computing node of a cloud portion of the processor-based machine learning system implemented in accordance with the edge-cloud architecture;

instantiating a feedback loop between the edge portion of the processor-based machine learning system and the cloud portion of the processor-based machine learning system, utilizing at least one network coupled between the edge and cloud portions;

receiving a task to be processed by the first neural network at the first computing node;

determining that the first neural network failed to process the task; and sending the task to the second computing node via the feedback loop for processing by the second neural network at the second computing node, wherein the first neural network is of a first type having a first accuracy level, and the second neural network is of a second type different than the first type, the second neural network having a second accuracy level higher than the first accuracy level, and further wherein the first neural network is at least in part converted from the second neural network.

20. The computer program product according to claim 19, wherein determining that the first neural network failed to process the task comprises:

acquiring processing data generated by the first neural network in processing the task; and determining, based on the processing data, that the first neural network failed to process the task.

* * * * *